United States Patent
Grant et al.

(10) Patent No.: US 10,838,389 B2
(45) Date of Patent: Nov. 17, 2020

(54) RECONFIGURABLE CONTROL ARCHITECTURE FOR PROGRAMMABLE LOGIC DEVICES

(71) Applicant: Hamilton Sundstrand Corporation, Charlotte, NC (US)

(72) Inventors: Christopher Grant, Chicopee, MA (US); John M. Maljanian, Farmington, CT (US); Michael T. Runde, East Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 104 days.

(21) Appl. No.: 16/218,855

(22) Filed: Dec. 13, 2018

(65) Prior Publication Data

US 2020/0192312 A1   Jun. 18, 2020

(51) Int. Cl.
  *G05B 19/045*  (2006.01)
  *G06F 30/34*   (2020.01)
  *G06F 15/78*   (2006.01)

(52) U.S. Cl.
  CPC .. *G05B 19/045* (2013.01); *G05B 2219/21109* (2013.01); *G05B 2219/25268* (2013.01)

(58) Field of Classification Search
  CPC ............ H01L 2924/1431; G06F 30/34; G06F 15/7867; G05B 19/045; G05B 2219/21109; G05B 2219/25268
  USPC ........................................................... 700/87
  See application file for complete search history.

(56) References Cited

U.S. PATENT DOCUMENTS

| | | | |
|---|---|---|---|
| 5,946,219 A | 8/1999 | Mason et al. | |
| 6,255,849 B1* | 7/2001 | Mohan | H03K 19/17752 326/38 |
| 9,286,262 B2 | 3/2016 | Lippett | |
| 2007/0283311 A1 | 12/2007 | Karoubalis et al. | |
| 2017/0315815 A1* | 11/2017 | Smith | G06F 9/3834 |

FOREIGN PATENT DOCUMENTS

WO        9414123 A1     6/1994

OTHER PUBLICATIONS

EP Search Report; EP Application No. 19216215.4; EP Filing Date: Dec. 13, 2019; dated May 12, 2020; 36 pages.

* cited by examiner

Primary Examiner — Michael J Brown
(74) Attorney, Agent, or Firm — Cantor Colburn LLP

(57) ABSTRACT

Provided are embodiments including a system and method for operating a reconfigurable control architecture for programmable logic devices. Some embodiments include a storage medium that is coupled to a programmable logic device and a dispatch mechanism that is operably coupled to the programmable logic device. In embodiments, the dispatch mechanism is configured is receive an object, select one or more constructs of the programmable logic device based on the object, schedule one or more inputs and outputs for each of the selected constructs based on the object, and execute a system level operation indicated by the object based on the schedule.

20 Claims, 12 Drawing Sheets

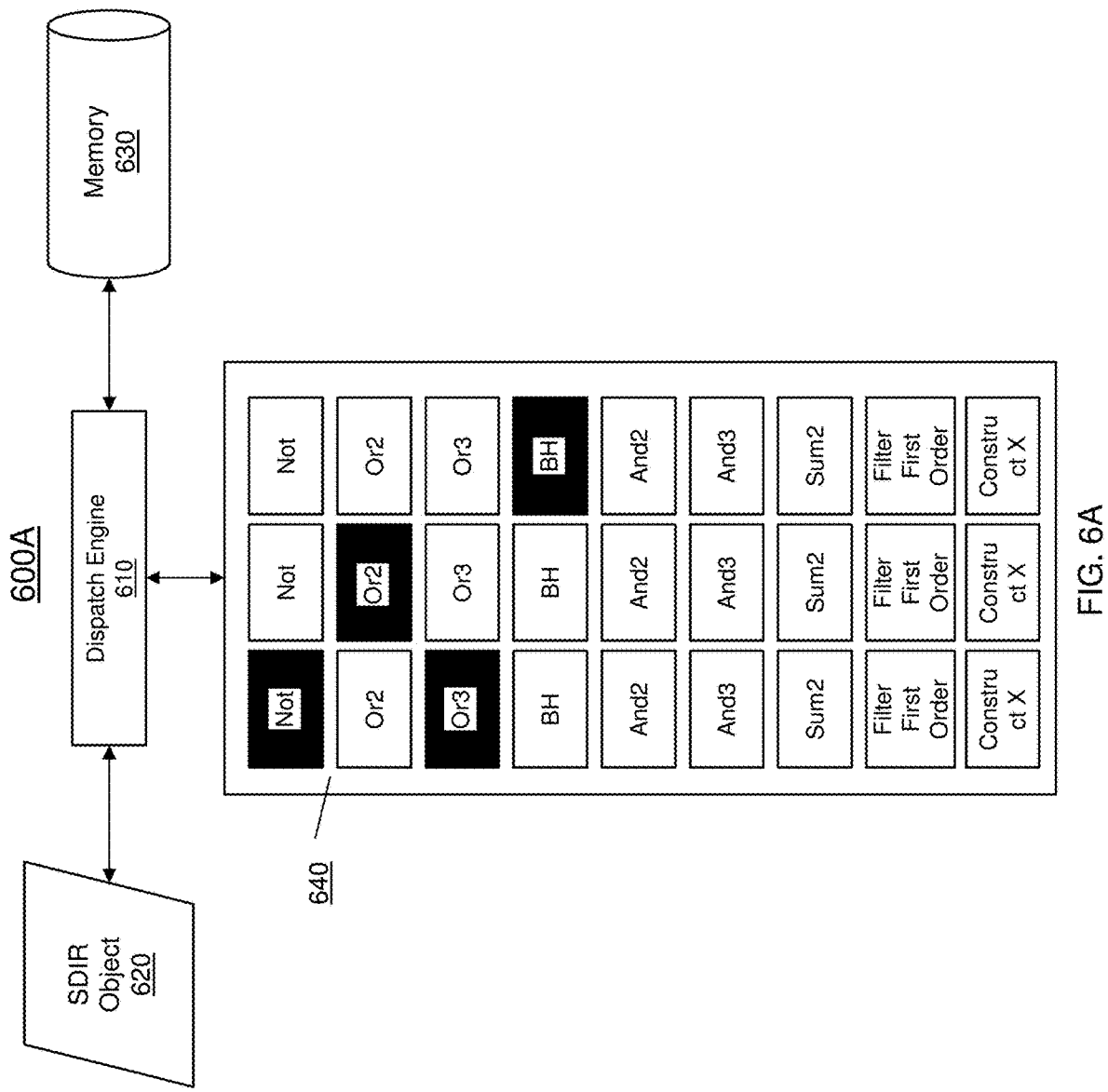

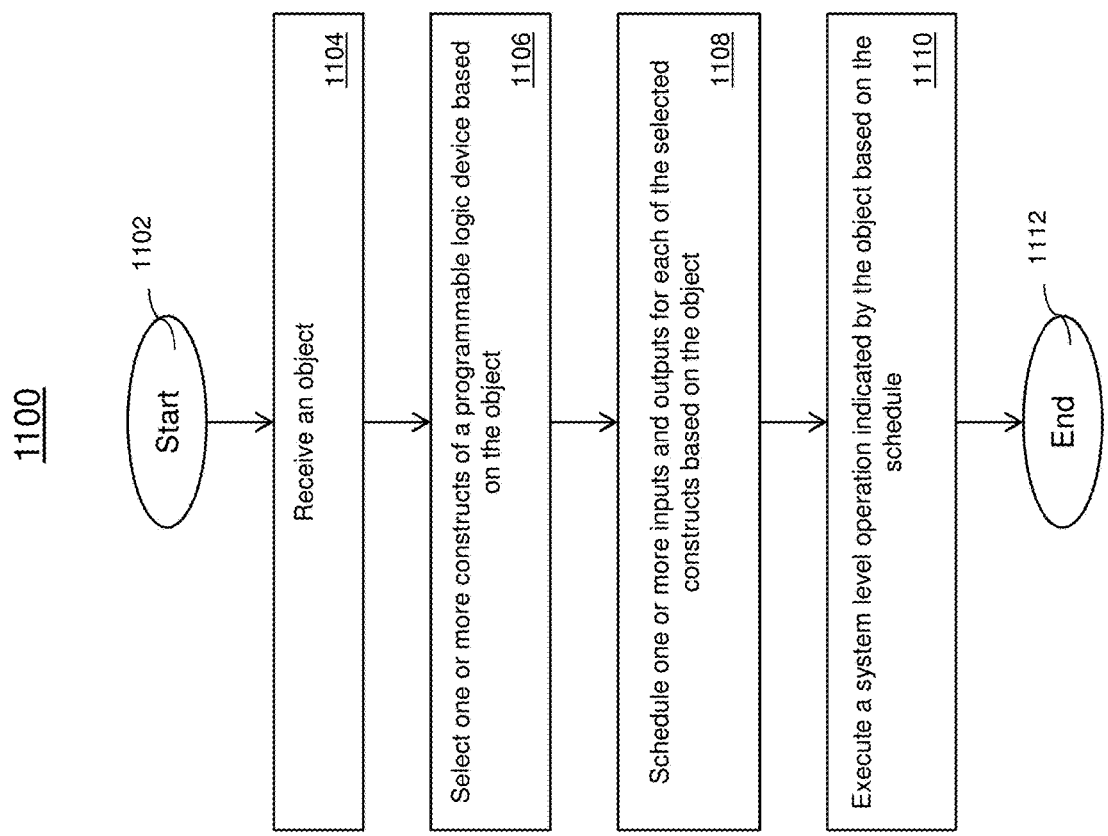

RECONFIGURABLE CONTROL ARCHITECTURE FOR PROGRAMMABLE LOGIC DEVICES

BACKGROUND

Exemplary embodiments pertain to the art of logic devices and more specifically to operating a reconfigurable control architecture for programmable logic devices.

A field-programmable gate array is an integrated circuit that can be configured by a programmer after manufacture. The FPGAs contain a number of building blocks which can be connected in a manner to perform various logic functions via the "fabric". In an aircraft environment, the FPGAs are used to control a variety of processes. For example, the FPGAs can be programmed to control electric power systems, air circulation management systems, hydraulic systems, etc. of an aircraft. The FPGAs can be programmed to the specific needs of the customer and applications. Given the tedious process of reprogramming the FPGA, there may be a need to develop an architecture to allow for efficient reconfiguration without modifying the fabric programming.

BRIEF DESCRIPTION

According to an embodiment, a system for operating a reconfigurable control architecture for programmable logic devices is provided. The system can include a storage medium, the storage medium being coupled to a programmable logic device, and a dispatch mechanism operably coupled to the programmable logic device. The dispatch mechanism can be configured to receive an object, select one or more constructs implemented in the programmable device based on the object, schedule one or more inputs and outputs for each of the selected constructs based on the object, and execute a system level operation indicated by the object based on the schedule.

In addition to one or more of the features described herein, or as an alternative, further embodiments include a dispatch mechanism that is further configured to retrieve the outputs from the one or more constructs, and direct the outputs based on the object.

In addition to one or more of the features described herein, or as an alternative, further embodiments include a dispatch mechanism that is further configured to select data from at least one of a memory or an I/O device based at least in part on the object, and provide the data to one or more constructs for execution based at least in part on the object.

In addition to one or more of the features described herein, or as an alternative, further embodiments include a dispatch mechanism that is further configured to store one or more outputs from the one or more constructs for the programmable devices based at least in part on a memory definition.

In addition to one or more of the features described herein, or as an alternative, further embodiments include an object that is based at least in part on a memory definition, a construct definition, and a system level operation.

In addition to one or more of the features described herein, or as an alternative, further embodiments include a dispatch mechanism that is further configured to receive a new object, perform a new operation in the programmable logic device based on the new object without re-wiring the programmable logic device, and execute, by the dispatch mechanism, the updated system level operation based on the updated object without re-wiring the programmable logic device.

In addition to one or more of the features described herein, or as an alternative, further embodiments include an object that indicates a sequence of executing the one or more constructs.

In addition to one or more of the features described herein, or as an alternative, further embodiments include a dispatch mechanism that is configured to execute a plurality of system level operations in parallel or in series based on the object.

In addition to one or more of the features described herein, or as an alternative, further embodiments include a plurality of dispatch mechanism configured to receive respective objects.

In addition to one or more of the features described herein, or as an alternative, further embodiments include a programmable logic device that is a field-programmable gate array (FPGA).

According to a different embodiment, a method for operating a reconfigurable control architecture for programmable logic devices is provided. The method can include receiving, by a dispatch mechanism, an object, selecting one or more constructs implemented in a programmable logic device based on the object, scheduling one or more inputs and outputs for each of the selected constructs based on the object, and executing, by the dispatch mechanism, the system level operation based on the schedule.

In addition to one or more of the features described herein, or as an alternative, further embodiments include retrieving the outputs from the one or more constructs, and directing the outputs based the object.

In addition to one or more of the features described herein, or as an alternative, further embodiments include selecting data from at least one of a memory or an I/O device based at least in part on the object, and providing the data to one or more constructs for execution based at least in part on the object.

In addition to one or more of the features described herein, or as an alternative, further embodiments include storing one or more outputs from the one or more constructs for the programmable devices based at least in part on a memory definition.

In addition to one or more of the features described herein, or as an alternative, further embodiments include using an object that is based at least in part on a memory definition, a construct definition, and a system level operation.

In addition to one or more of the features described herein, or as an alternative, further embodiments include receiving a new object, performing a new operation in the programmable logic device based on the new object without re-wiring the programmable logic device, and executing, by the dispatch mechanism, the updated system level operation based on the updated object without re-wiring the programmable logic device.

In addition to one or more of the features described herein, or as an alternative, further embodiments include using an object that indicates a sequence of executing the one or more constructs.

In addition to one or more of the features described herein, or as an alternative, further embodiments include executing a plurality of system level operations in at least one of a parallel fashion or a series fashion based on the object.

In addition to one or more of the features described herein, or as an alternative, further embodiments include receiving a plurality of objects.

In addition to one or more of the features described herein, or as an alternative, further embodiments include using a programmable logic device that is a field-programmable gate array (FPGA).

Technical effects of embodiments of the present disclosure include providing a reconfigurable control architecture for programmable devices that can implement dynamic system operations without reprogramming the fabric connecting the logic blocks of the programmable devices.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIGS. 6A and 6B depict a system including a dispatch mechanism used in accordance with one or more embodiments;

FIG. 11 depicts a flowchart of a method for operating a reconfigurable control architecture for programmable logic devices in accordance with one or more embodiments.

DETAILED DESCRIPTION

FPGAs have the capability of executing logic/equations at a high rate and provide parallel/distributed computation functionality. Logic blocks are the fundamental building blocks of the FPGAs, where the logic blocks include inputs to receive external signals and can be wired to communicate with other logic blocks in the routing channels. The routing channels and logic blocks of the FPGAs can be configured to perform the processing of any digital algorithm.

Traditionally fixed logic/equations have been implemented within the fabric of the FPGA and are connected statically to perform a system function. In order to implement new system functions using the FPGA, programming of the device logic blocks is required to modify equations and system behavior. Programming the FPGA requires physically changing the paths, connections, routes of the chip to build the logic into the FPGA fabric.

Verification and validation of a new device can be difficult and cumbersome due to placement and routing changes, timing interactions, and other specific device characteristics. In addition, many industries require expensive certification activities with the smallest change. Because reprogramming the FPGA includes modifying the FPGA fabric there may be a need to provide an architecture for efficient reconfiguration of the FPGA. The techniques that are described herein obviate the need to reprogram ("re-wire") the FPGA fabric by dynamically operating the constructs defined by the logic blocks (fabric) of the FPGA to perform an operation. The constructs are functions that are composed of the logic blocks. Non-limiting examples of constructs can include AND, OR, Boolean Hold, Sum, Filter First Order, etc.

One or more embodiments provide methods and systems that facilitate fast and cost-effective modifications of a software tool that is to be installed and run on aircraft systems. Specifically, the methods and systems incorporate a set of new logic functions by implementing the constructs controlled by the dispatch mechanism, instead of directly modifying the FPGA fabric to incorporate new functions. This technique avoids performing long and costly verification processes on the software tool.

Figure 1:
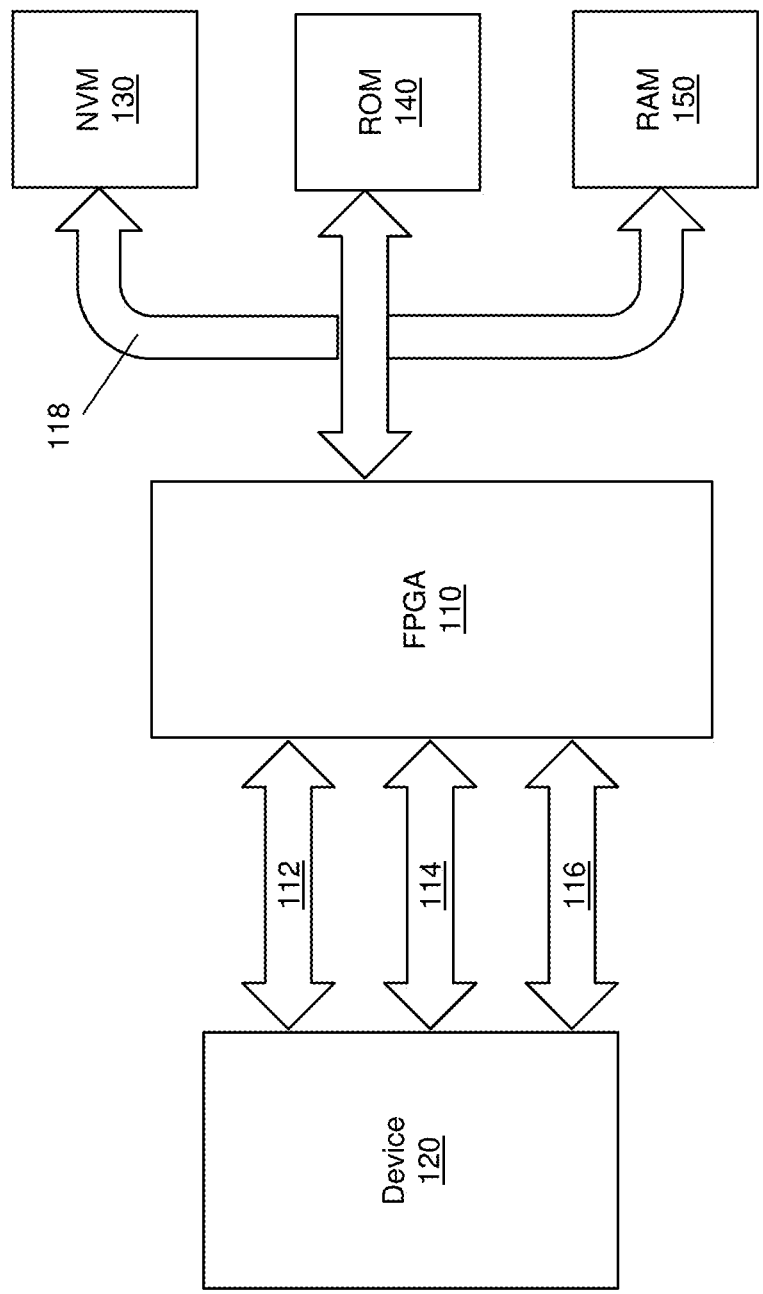
FIG. 1 depicts a block diagram illustrating one example of a processing system for practice of the teachings herein.

Now turning to FIG. 1, there is shown an embodiment of a system 100 for implementing the teachings described herein. In this non-limiting embodiment, the system 100 includes a programmable device such as the FPGA 110. The FPGA 110 includes a plurality of constructs that can be used to perform various system functions. As shown, the FPGA 110 is coupled to a device 120. The device 120 can include but is not limited to a processor, I/O peripherals, communication peripherals, mass storage, or other programmable logic device. The FPGA 110 can be coupled to the device 120 over one or more communication channels such as an I/O system bus 112, an external interface system bus 114, or a communication bus 116.

The FPGA 110 can be coupled to memory or storage device(s) including non-volatile memory 130, ROM 140, or RAM 150. The FPGA 110 can be coupled to the storage device(s) over a memory system bus 118. It should be understood the system 100 is only an example and is not intended to limit the configuration or architecture of the system 100.

Figure 2:
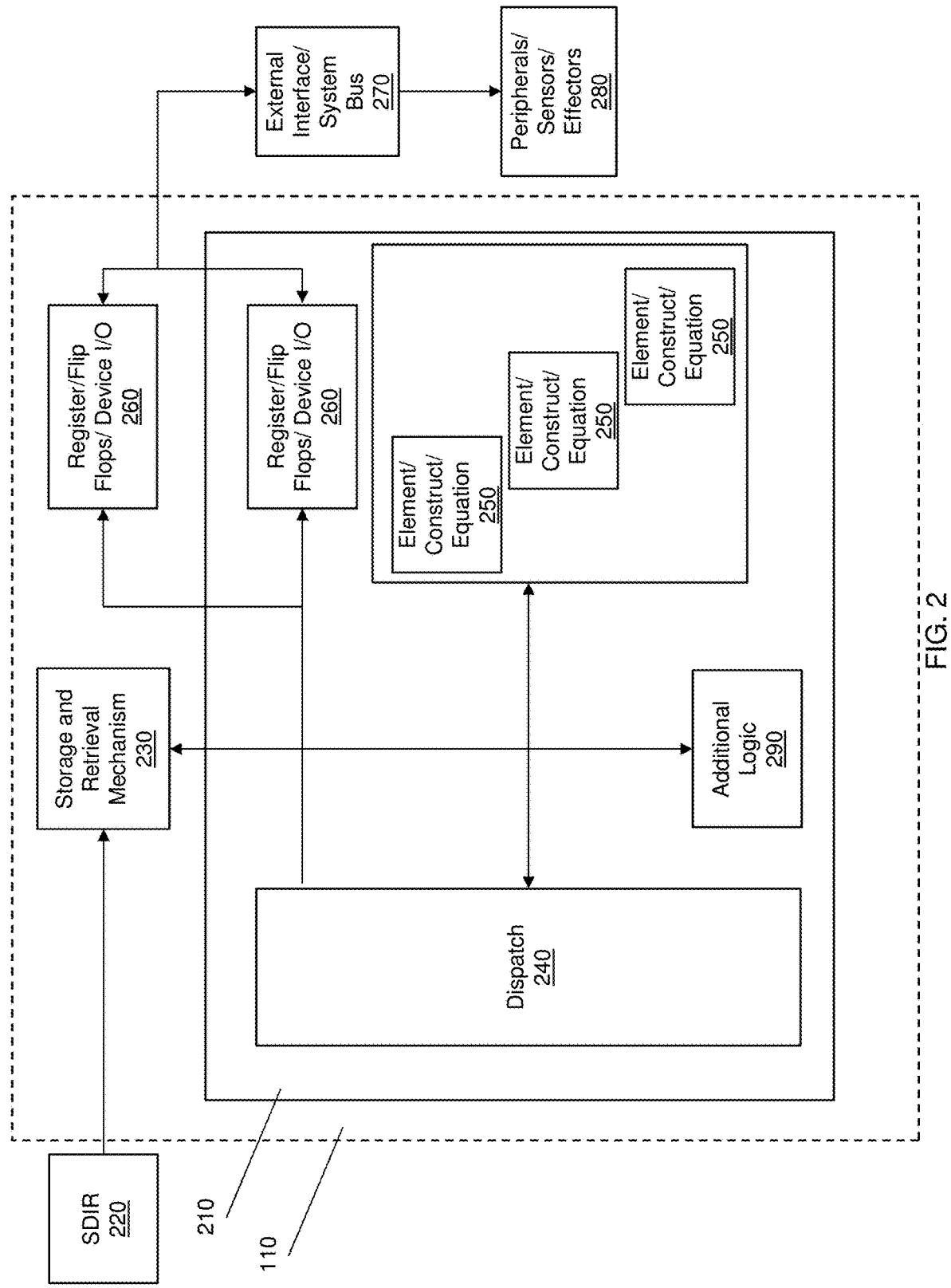
FIG. 2 depicts another block diagram illustrating one example of a processing system for practice of the teachings herein.

Now referring to FIG. 2, a system 200 for operating a reconfigurable control architecture for programmable logic devices is shown. By implementing the dispatch mechanism 240 in the system, the FPGA is no longer limited to performing fixed operations after initially programming the FPGA fabric. The dispatch mechanism 240 is tasked with reading the input file and selecting the inputs to provide to one or more constructs for the FPGA. In addition, the dispatch mechanism 240 is further tasked with directing the output of the one or more constructs. The outputs can be stored or provided to other constructs for further processing. If the data is to be stored, the input (e.g., an SDIR discussed with reference to FIG. 2) file provides information on the memory or storage location. This allows for the flexibility of the system to implement new operations without reprogramming the FPGA fabric, thereby, avoiding the costs of the verification process.

The system 200 includes an FPGA 110 such as that shown in FIG. 1. In one or more embodiments, the FPGA fabric 210 can contain the elements including the constructs, dispatch mechanism, etc. The FPGA 110 is configured to receive an input such as the SDIR object 220. The SDIR object 220 is formed based on one or more components as discussed with reference to FIG. 4. The SDIR object 220 can be a data file that can inform the dispatch mechanism 240 which inputs to provide to the constructs of the programmable device and the destination for the outputs of the constructs. For example, the outputs can be stored for a period of time and later used as an input to another construct, or the outputs can be provided to another device or process such as devices 280 for performing a function.

The system 200 includes a storage and retrieval mechanism 230 that is located on the FPGA 110. In other embodiments, the storage and retrieval mechanism 230 can be located external to the FPGA 110. The storage and retrieval mechanism 230 is configured to receive the SDIR object 220 and communicate with the dispatch mechanism 240.

The dispatch mechanism 240 is configured to implement the contents of the SDIR 220 in the FPGA 110. The dispatch mechanism 240 performs scheduling to determine a sequence the inputs are provided to the constructs 250 of the FPGA 110 and manage the outputs from the constructs 250 of the FPGA 110. In one or more embodiments, all of the constructs 250 are executed where the dispatch mechanism 240 will determine the inputs. Constructs 250 that do not receive inputs can have their outputs discarded since no usable data results from the executing those constructs. The dispatch mechanism 240 uses the data from the SDIR object associated with the construct definition, memory definition, and the logic operation to execute the system function in the FPGA 110. The dispatch mechanism is coupled to the one or more constructs on the FPGA 110. In addition, the dispatch mechanism 240 can be coupled to one or more components such as devices 260. These devices 260 can include but are not limited to registers, flip-flops, and I/O devices.

An external interface system bus 270 can be coupled to the system 200 to exchange data with other systems and/or devices 280 that are external to the programmable logic device. The devices 280 can include but are not limited to peripheral devices, sensors, and effectors.

It should be understood that the other logic implementation modules implemented in software, hardware, or a combination thereof can be used incorporated into the system to process the SDIR object 220 such as the additional logic implementation module 290.

For example, the storage and retrieval mechanism 230 can be located external to the programmable logic device and a RAM can be located internal to the programmable logic device. In a different example, the SDIR object 220 can be received by the external interface system bus. In yet another example, a processor can be coupled to the external interface system bus 270.

Figure 3:
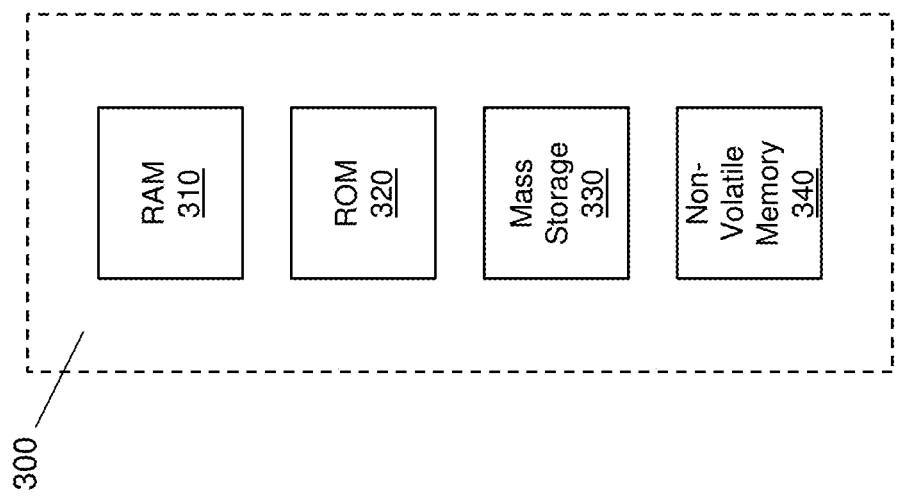
FIG. 3 depicts a block diagram of a storage and retrieval module in accordance with one or more embodiments.

FIG. 3 depicts an example storage and retrieval mechanism 230. The storage and retrieval mechanism includes one or more storage devices 300. The storage devices can include random-access memory (RAM) 310, read-only memory (ROM) 320, mass storage 330, or non-volatile memory 340. It should be appreciated that a different arrangements or configurations of storage devices can be used. For example, the storage devices 300 can be included in the storage and retrieval mechanism 230. In another example, the storage devices 300 can be external to the storage and retrieval mechanism. In a further example, the storage devices can be located internal/external the programmable logic device shown in FIG. 2. A dispatch mechanism 240 can be coupled to the storage and retrieval mechanism 230 to obtain data including an SDIR 220 for processing.

Figure 4:
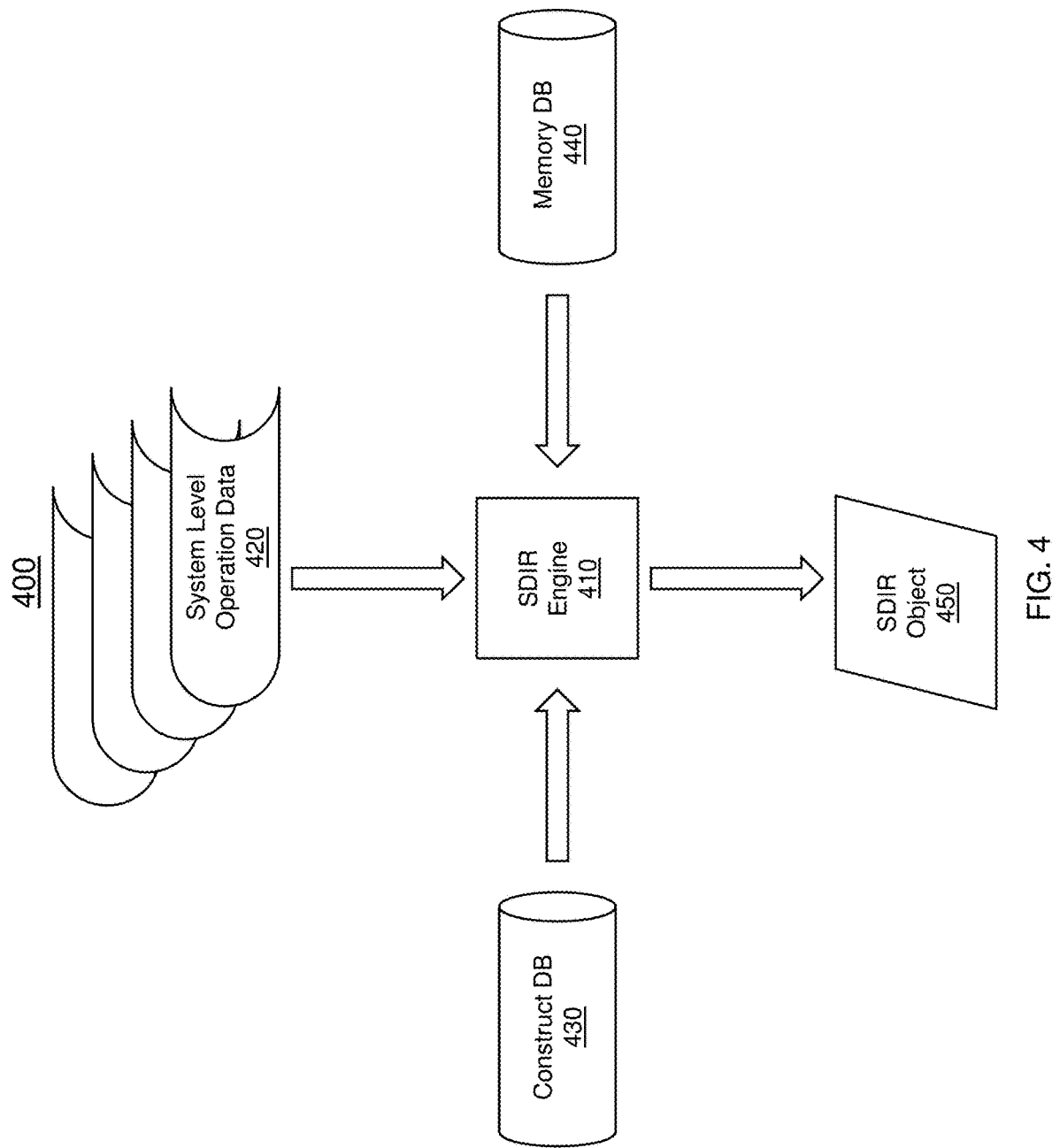
FIG. 4 depicts a system for operating a reconfigurable control architecture for programmable logic devices in accordance with one or more embodiments.

FIG. 4 depicts a system 400 for operating a reconfigurable control architecture for programmable logic devices in accordance with one or more embodiments. The system 200 includes a system data information representation (SDIR) engine 410 for performing a conversion process. The SDIR engine 410 receives system level operation data 420 to perform the conversion process. The system level operation data 420 can include system equations, system logic, system models, or any other system function that is to be performed. A non-limiting example of the system level operation data 420 is shown below with reference to FIG. 5.

The conversion process generates an SDIR object 450 that is used by a dispatch mechanism such as that shown in FIG. 4 which interfaces with an FPGA to execute the system level operation. The SDIR engine 410 is configured to receive the system level operations data 420 and determines a sequence of inputs and outputs that are to be executed in a construct of the FPGA. Because the constructs are not dedicatedly wired to execute the system level operation, the dispatch unit must manage the timing and sequencing that inputs will be provided to the constructs and the timing and sequencing of storing outputs and obtaining the outputs to be provided as inputs to one or more constructs. This allows for the reconfigurable control architecture for the programmable logic devices.

The system 400 also includes a construct definition database (CDDB) 430. The CDDB 430 includes data associated with the constructs that are available for execution in an associated FPGA. The SDIR engine 410 is configured to determine the sequence of inputs and outputs of each representation of the system level operations data 420 and the SDIR object 450 is used to select the various constructs in the CDDB 430. In one or more embodiments, complex constructs can be implemented in the system by combining two or more simple constructs. In addition, other complex constructs may not be a combination of one or more simple constructs.

The system 400 also includes a memory definition database (MDDB) 440. MDDB 440 identifies the locations in a memory where data is stored or where in memory the data will be retrieved from perform an operation. The MDDB 440 is configured to provide information of the location of the inputs and outputs used in the execution of the system level operation data 420 and encoded in the SDIR Object 450. The inputs can be retrieved and provided to the constructs of the FPGA for processing. The results of the constructs will be stored as defined by the MDDB 440 and can be obtained for subsequent processing. For example, the data can be retrieved from the location specified by the MDDB 440 and provided as an input for another construct or provided as an output to another process.

The SDIR engine 410 is configured to generate the SDIR object 450 which can be used by a dispatch mechanism to execute the system level operation according to the logic/equation, the memory definition, and the construct definition.

Figure 5:
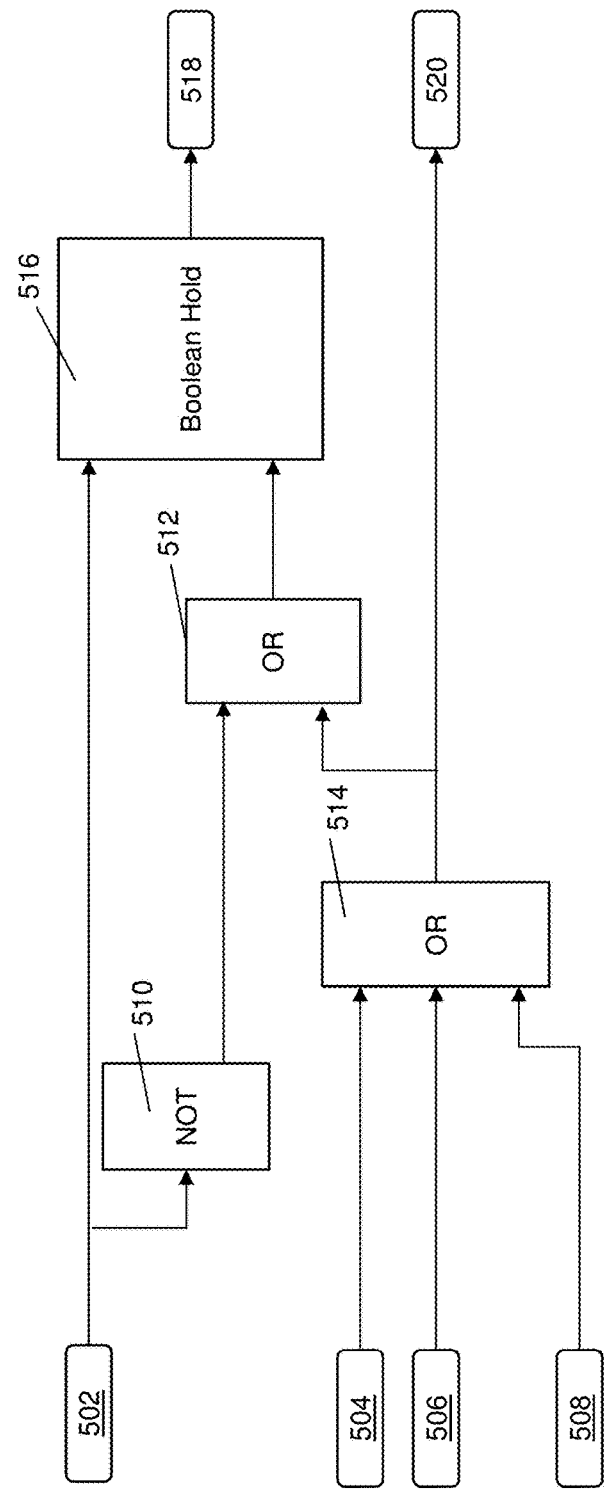
FIG. 5 depicts an example system level operation in accordance with one or more embodiments.

FIG. 5 depicts a schematic 500 of an example system level operation that is to be implemented by the methods and systems described herein. The system level operation is implemented with 4 individual constructs that are connected in a logical sequence. For example, the constructs include a NOT element 510, 2-input OR gate 512, 3-input OR gate 514, and a Boolean hold element (BH) 516. The constructs will be implemented within the FPGA without the connection information (routing channels) connecting each of the constructs as shown in the example. The inputs and outputs to each of the constructs are managed by a dispatch mechanism that processes the SDIR object 450 for the representation of the system level operation.

In one or more embodiments the first input 502 can be associated with system power. The second and third inputs 504, 508 can be associated with the distribution valves and fuel balancing, respectively. The fourth input 508 can be associated with the status of the main tanks. This logic can be processed to determine whether to open/close the distribution valves as shown at outputs 518, 520, respectively. In an example, as indicated in the SDIR object 450, a dispatch mechanism can provide the inputs 504, 506, and 508 to the 3-input OR gate 514. Next, the dispatch mechanism can take the output of the 3-input OR gate 514 and store it in memory until it is needed such as when it is to be provided to as an input to the 2-input OR gate 512 with the output of the NOT element 510. The dispatch mechanism is configured to manage the inputs and outputs of each of the constructs.

In one or more embodiments, the SDIR Engine 410 converts the system level operation 420 into the SDIR Object 450, that is usable by the dispatch mechanism. The constructs can be selected from the construct DB based on the system logic/equation to be performed. The inputs that are to be used for the construct can be obtained from memory or a device such as an I/O device and be provided to the constructs for operation.

FIG. 6A depicts a system 600A for implementing a reconfigurable control architecture for programmable logic devices using a dispatch mechanism 610. As shown, the dispatch mechanism 610 receives the SDIR object 620 which represents the system level operation such as that shown in FIG. 5. The dispatch mechanism 610 determines the sequence of constructs to execute the system level operation. The sequence of constructs can be representative of the connections of a conventional FPGA. The dispatch mechanism 610 is configured to store and obtain data in the memory 630 as needed as determined by the SDIR object 620. In particular, the data associated with the memory definition DB is used to identify where to store data and retrieve data from the memory 630. As shown, the highlighted constructs of the construct database 640 are selected to execute the equation shown in FIG. 5. The dispatch mechanism 610 operates as a scheduler based on the desired system level operation to be executed. As shown, the constructs that were selected in this example include the NOT logic element, the 2-input OR gate, the 3-input OR gate, and the BH.

Figure 6B:
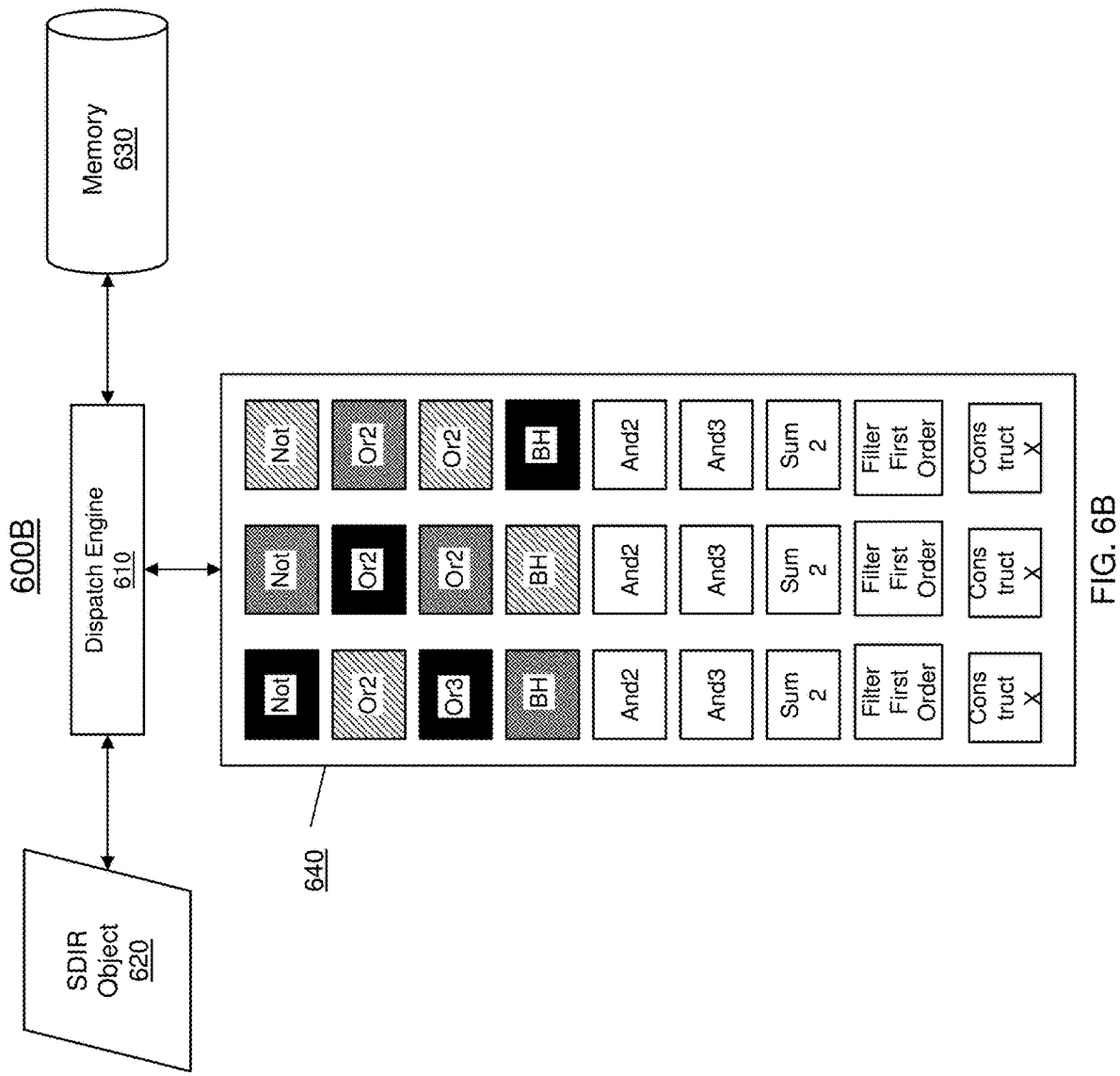

FIG. 6B depicts a system 600A for implementing a reconfigurable control architecture for programmable logic devices using a dispatch mechanism 610. As shown, the different patterns of shading can indicate a subsequent iteration of the system level operation. As shown, each set of logic elements are selected to perform the system level operation as defined in the SDIR object 620.

Figure 7:
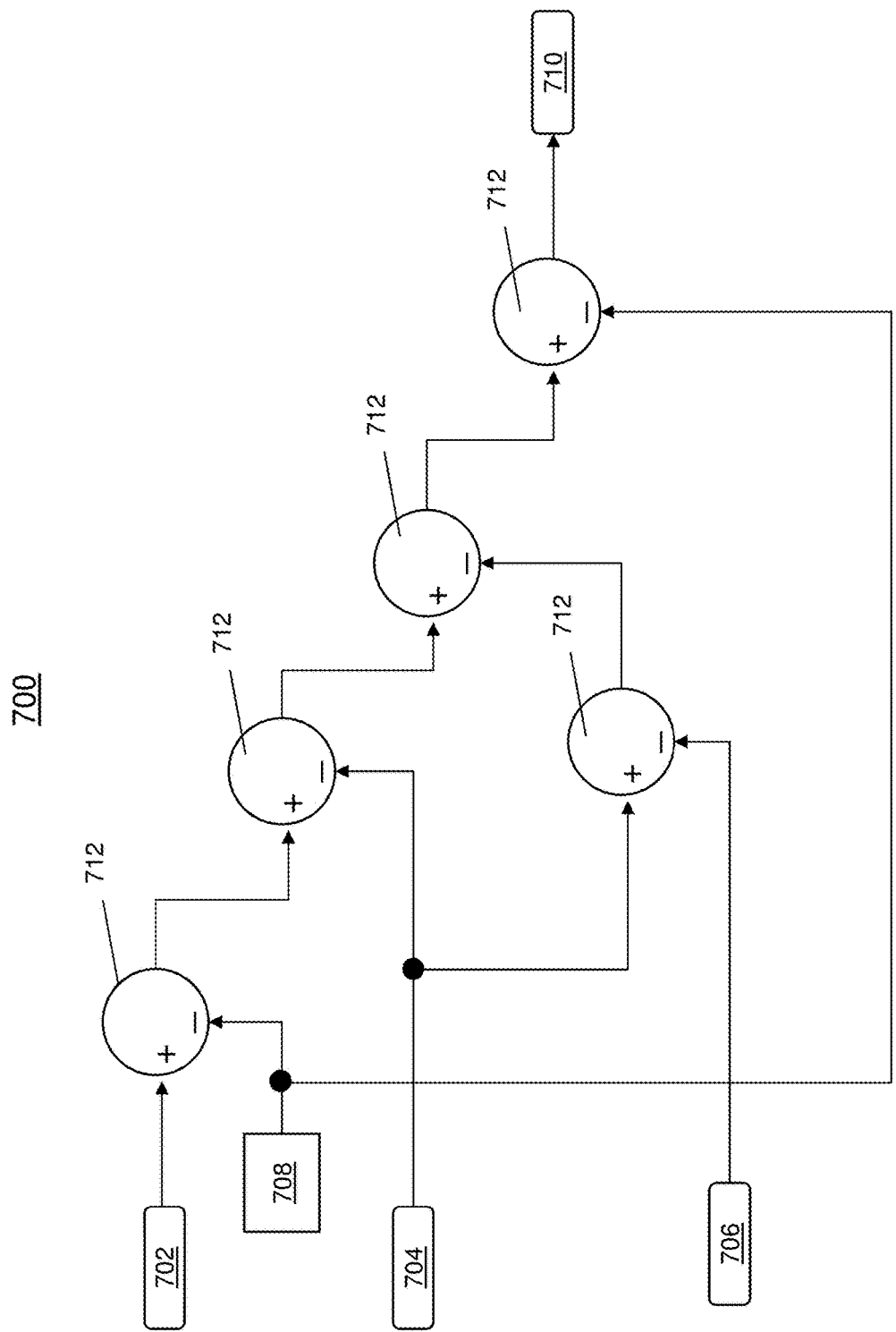
FIG. 7 depicts another example system level operation in accordance with one or more embodiments.

FIG. 7 depicts a schematic 700 of an example system level operation that is to be implemented by the methods and systems described herein. The system level operation includes inputs 702, 704, and 706, multiple adders 712, and an output 710. In this example, the system level operation is provided to an SDIR engine 410 to generate an SDIR object 450 that is to be used by a dispatch mechanism to execute the system level operation.

Figure 8:
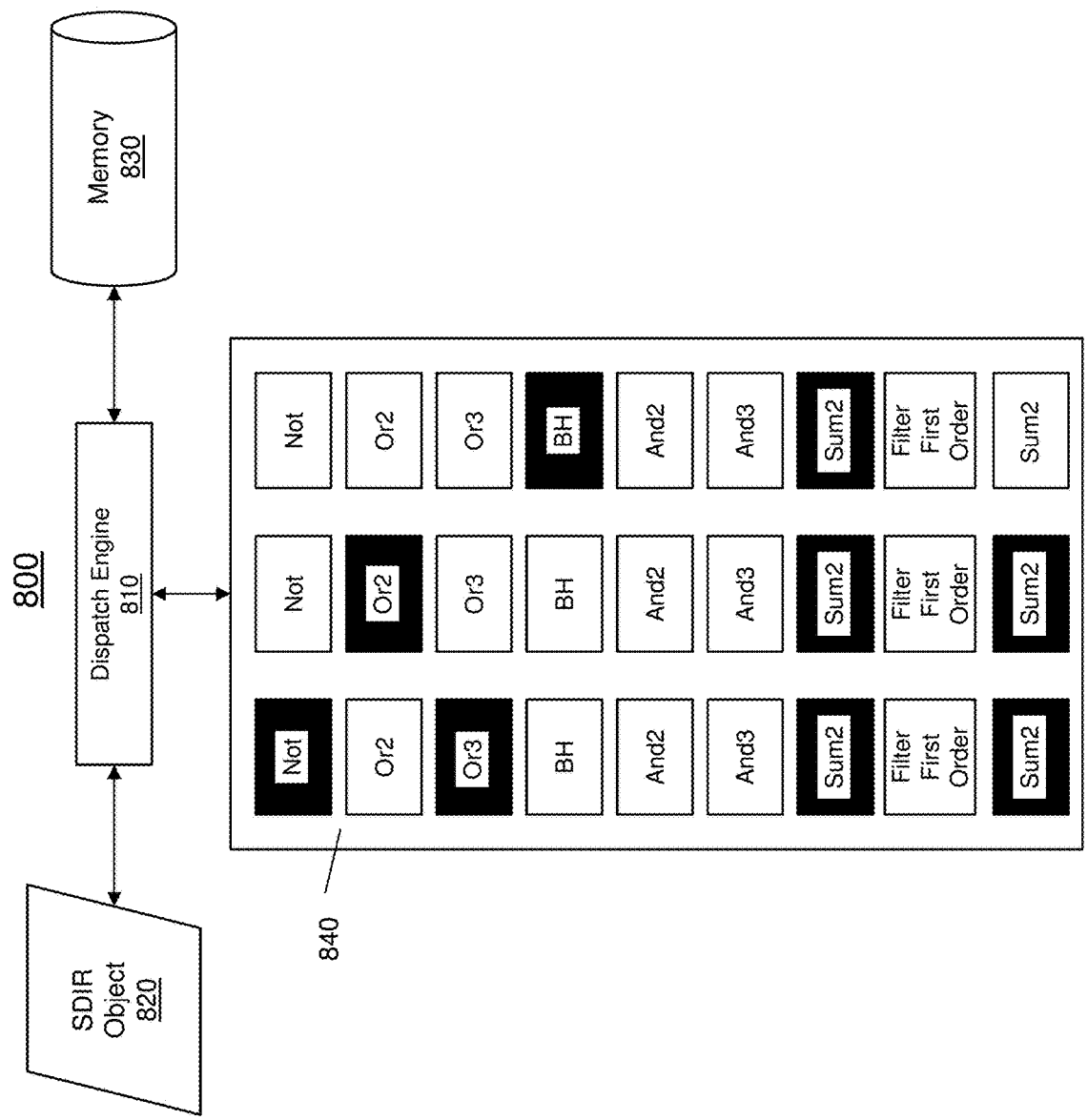
FIG. 8 depicts a parallel execution of system operations in accordance with one or more embodiments.

Now referring to FIG. 8, a system 800 for implementing a reconfigurable control architecture for programmable logic devices using a dispatch mechanism 610 where the logic associated with FIGS. 5 and 7 are simultaneously executed. As shown, the constructs for both system level operations are selected (highlighted) and the inputs and outputs for executing the system level operations are controlled by the dispatch mechanism 610. Similar to the operation of traditional FPGAs, multiple operations can be performed simultaneously. In the example, after the SDIR object 620 is received, the dispatch mechanism 610, coupled to the memory 630, performs the parallel execution of the system level operations of that shown in FIG. 3 and FIG. 5 which interfaces with the constructs implemented in the FPGA 640.

Figure 9:
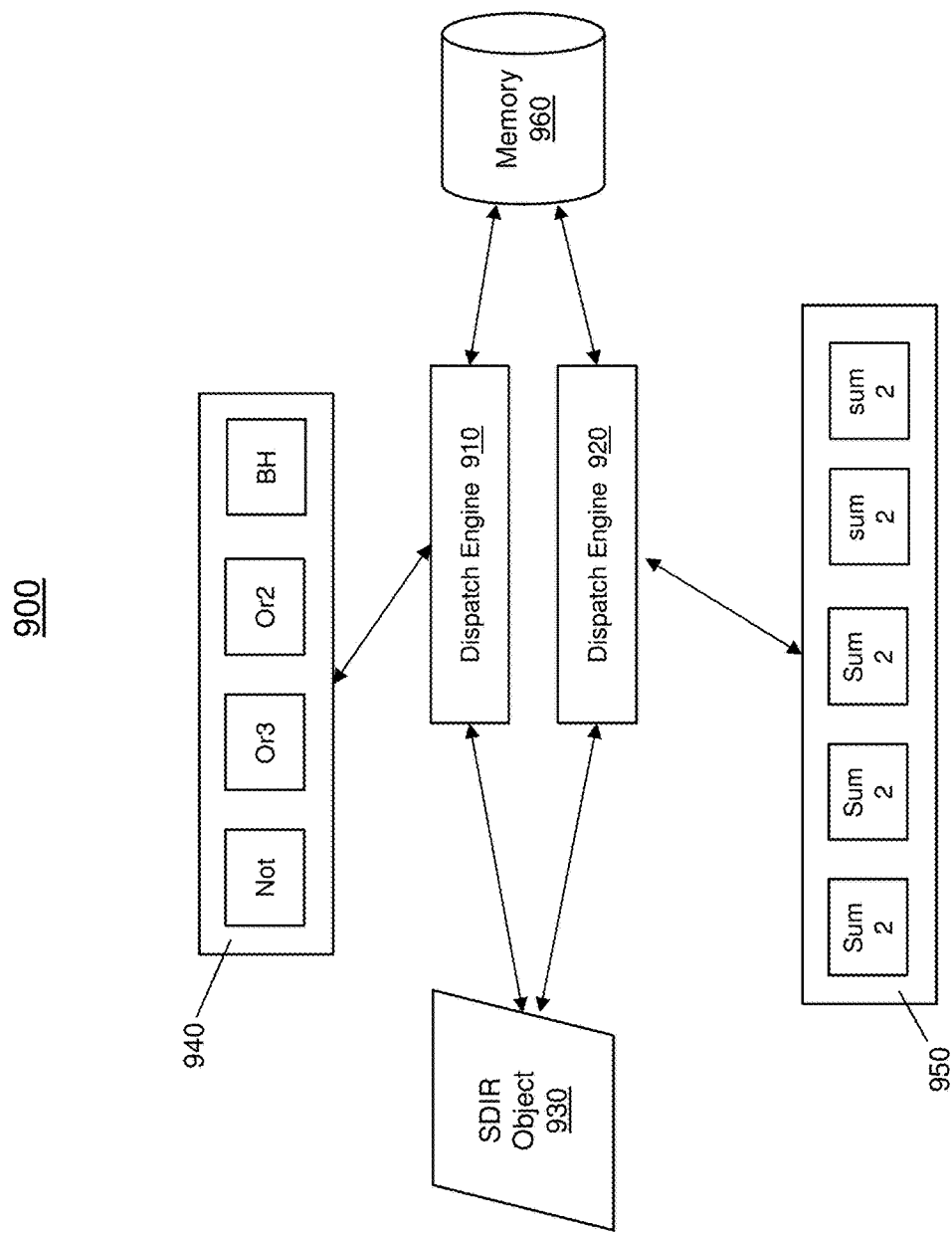
FIG. 9 depicts a system including multiple dispatch mechanisms in accordance with one or more embodiments.

Now referring to FIG. 9, a system 900 including a plurality of dispatch mechanisms is shown. System 900 includes a first and second dispatch mechanism 910, 920 respectively. Each dispatch mechanisms 910, 920 is configured to receive an SDIR object 930. Dispatch mechanism 910 is configured to perform a first system level operation 740 similar to that shown in FIG. 5. Dispatch mechanism 920 is configured to perform a second system level operation 950 similar to that shown in FIG. 7. In one or more embodiments, the first and second system level operations 940 and 950 can be performed in parallel. In some embodiments, the first and second system level operations 940 and 950 can be performed serially. It should be understood that any number of system level operations can be performed simultaneously in parallel or can be performed serially. The dispatch mechanisms 910, 920 are operably coupled to a memory 960 and the dispatch mechanisms 910, 920 is configured to store data in the memory 960 and access data from the memory 960.

Figure 10:
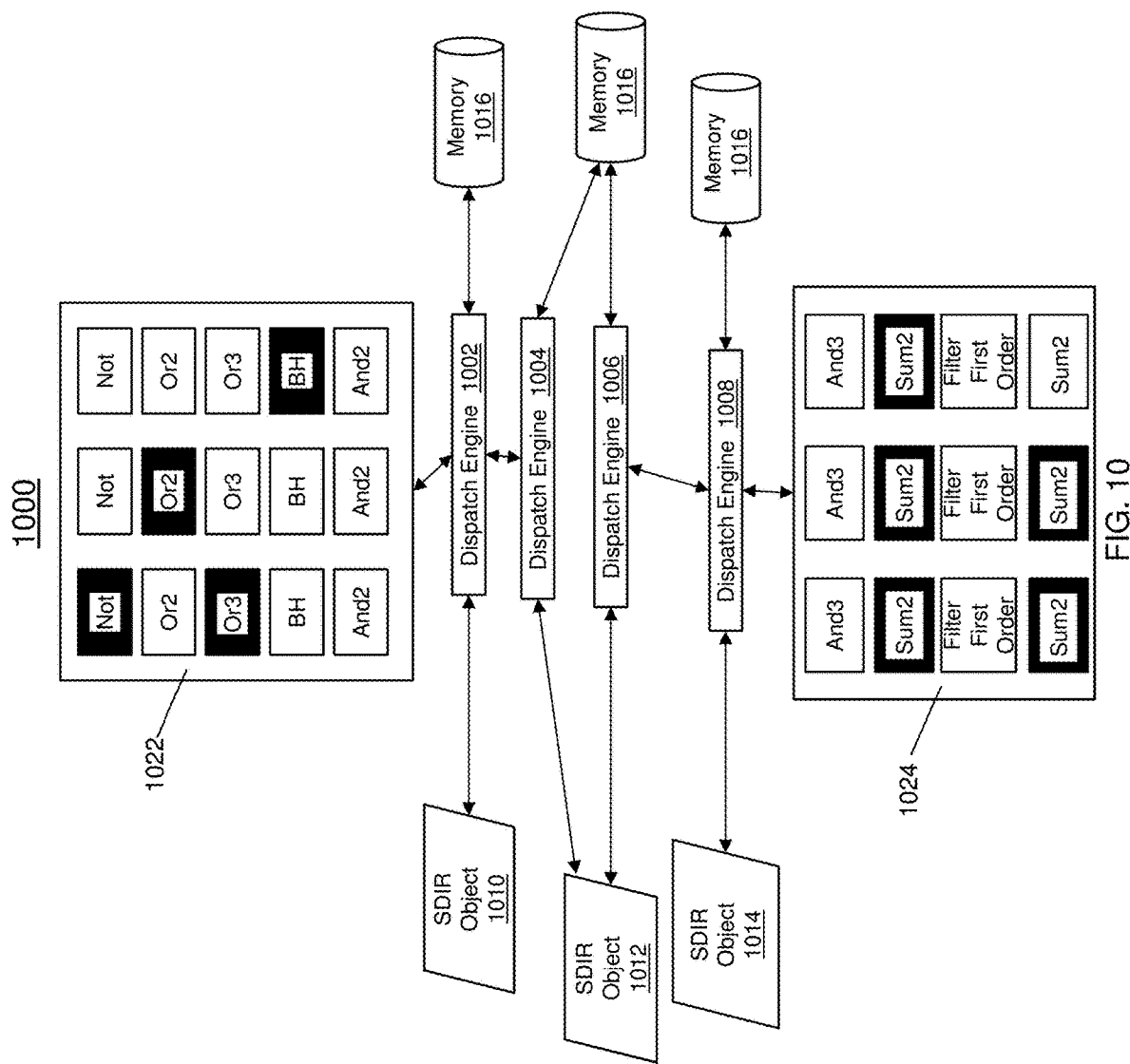
FIG. 10 depicts another system including multiple dispatch mechanisms in accordance with one or more embodiments.

Now referring to FIG. 10, another configuration of a system 1000 is shown in accordance with one or more embodiments. The system 1000 includes a plurality of dispatch mechanisms 1002-1008, SDIR objects 1010-1014, memories 1016-1020, and FPGA 1022, 1024. It should be understood that different configurations including multiple dispatch mechanisms, memories, inputs (objects), and constructs can be used. In this example, multiple SDIR objects 1010-1014 are received and processed by different dispatch mechanisms 1002-1024.

FIG. 11 depicts a flowchart of a method 1100 for operating a reconfigurable control architecture for programmable logic devices. The method 1100 begins at block 1102 and proceeds to block 1104 which provides for receiving, by a dispatch mechanism, an object. In one or more embodiments, the dispatch mechanism can be implemented in software, hardware, or a combination thereof.

The method 1100 continues to block 1106 which provides for selecting one or more constructs implemented in a programmable logic device based on the object. In some embodiments, the programmable logic device is an FPGA. The object can include information and/or data indicating logic or an equation for performing a system level operation. A combination of constructs within the FPGA can be selected to perform the system level operation according to the received object.

Block 1108 provides for scheduling one or more inputs and outputs for each of the selected constructs based on the object. The dispatch mechanism 240 is configured to provide inputs to the selected constructs and direct the outputs of the constructs to perform the system level operation. The inputs can be obtained from memory/storage or can be obtained from a device/sensors/peripheral.

Block 1110 provides for executing a system level operation indicated by the object based on the schedule. The system level operation is executed under the direction of the dispatch mechanism based on the received object and or file. By using the dispatch mechanism, new system level operations can be implemented into a system without reprogramming the FPGA fabric.

The method 1100 can end at block 1112 or be repeated to iterate through the remaining system level operations of one or more SDIRs. It should be understood that one or more steps of the process can be performed in a different order or other steps can be included and is not limited by the example provided in FIG. 11.

The technical effects and benefits include avoiding the necessity to reprogram the FPGA by updating the FPGA fabric to implement new system functions. The dispatch mechanism can be leverage to manage the inputs and outputs of the selected constructs to implement new system functions using the existing FPGA fabric. Therefore, there is no requirement to conduct the costly verification process associated with reprogramming the FPGA.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for operating a reconfigurable control architecture for programmable logic devices, the system comprising:
   a non-transitory storage medium, the non-transitory storage medium being coupled to a programmable logic device;
   a dispatch mechanism operably coupled to the programmable logic device, wherein the dispatch mechanism is configured to:
      receive an object;
      select one or more constructs to receive one or more inputs implemented in the programmable logic device based on the object;
      schedule the one or more inputs and outputs for each of the selected one or more constructs based on the object; and
      execute a system level operation indicated by the object based on the schedule, wherein executing the system level operation comprises executing all of the constructs including the one or more selected constructs that received the one or more inputs.

2. The system of claim 1, wherein the dispatch mechanism is further configured to retrieve the outputs from the one or more constructs; and
   direct the outputs based on the object.

3. The system of claim 1, wherein the dispatch mechanism is further configured to select data from at least one of a memory or an I/O device based at least in part on the object; and
   provide the data to one or more constructs for execution based at least in part on the object.

4. The system of claim 1, wherein the dispatch mechanism is further configured to store one or more outputs from the one or more constructs for the programmable devices based at least in part on a memory definition.

5. The system of claim 1, wherein the object is based at least in part on a memory definition, a construct definition, and a system level operation.

6. The system of claim 1, wherein the dispatch mechanism is further configured to receive a new object;
   perform a new operation in the programmable logic device based on the new object without re-wiring the programmable logic device; and
   execute, by the dispatch mechanism, the updated system level operation based on the updated object without re-wiring the programmable logic device.

7. The system of claim 1, wherein the object indicates a sequence of executing the one or more constructs.

8. The system of claim 1, wherein the dispatch mechanism is configured to execute a plurality of system level operations in parallel or in series based on the object.

9. The system of claim 1, further comprising a plurality of dispatch mechanism configured to receive respective objects.

10. The system of claim 1, wherein the programmable logic device is a field-programmable gate array (FPGA).

11. A method for operating a reconfigurable control architecture for programmable logic devices, the method comprising:
    receiving, by a dispatch mechanism, an object;
    selecting one or more constructs to receive one or more inputs implemented in a programmable logic device based on the object;
    scheduling the one or more inputs and outputs for each of the selected one or more constructs based on the object; and
    executing, by the dispatch mechanism, the system level operation based on the schedule, execute a system level operation indicated by the object based on the schedule, wherein executing the system level operation comprises executing all of the constructs including the one or more selected constructs that received the one or more inputs.

12. The computer-implemented method of claim 11, further comprising retrieving the outputs from the one or more constructs; and
    directing the outputs based the object.

13. The computer-implemented method of claim 11, further comprising selecting data from at least one of memory or an I/O device based at least in part on the object; and
    providing the data to one or more constructs for execution based at least in part on the object.

14. The computer-implemented method of claim 11, further comprising storing one or more outputs from the one or more constructs for the programmable devices based at least in part on a memory definition.

15. The computer-implemented method of claim 11, wherein the object is based at least in part on a memory definition, a construct definition, and a system level operation.

16. The computer-implemented method of claim 11, further comprising receiving a new object; and
   performing a new operation in the programmable logic device based on the new object without re-wiring the programmable logic device;
   execute, by the dispatch mechanism, the updated system level operation based on the updated object without re-wiring the programmable logic device.

17. The computer-implemented method of claim 11, wherein the object indicates a sequence of executing the one or more constructs.

18. The computer-implemented method of claim 11, further comprising executing a plurality of system level operations in at least one of a parallel fashion or a series fashion based on the object.

19. The computer-implemented method of claim 11, further comprising receiving a plurality of objects.

20. The computer-implemented method of claim 11, wherein the programmable logic device is a field-programmable gate array (FPGA).

* * * * *